April 25, 1939.    W. S WATTS    2,156,136
CLUTCH CONTROL MECHANISM
Original Filed Oct. 20, 1933    2 Sheets-Sheet 1

INVENTOR
WILLIAM S. WATTS
BY H. O. Clayton
ATTORNEY

April 25, 1939. W. S. WATTS 2,156,136
CLUTCH CONTROL MECHANISM
Original Filed Oct. 20, 1933 2 Sheets-Sheet 2

INVENTOR
WILLIAM S. WATTS
BY
ATTORNEY

Patented Apr. 25, 1939

2,156,136

UNITED STATES PATENT OFFICE 2,156,136

CLUTCH CONTROL MECHANISM

William S. Watts, South Bend, Ind., assignor to Bendix Aviation Corporation, South Bend, Ind., a corporation of Delaware Original application October 20, 1933, Serial No. 694,437. Divided and this application December 30, 1936, Serial No. 118,369

4 Claims. (Cl. 192—.01)

This invention relates in general to power operated clutch control mechanism for an automotive vehicle, and in particular to means for regulating the clutch engaging operation of the mechanism.

This invention is directed to the improvement of the so-called automatic clutch of the present day, wherein the throttle operating means of the vehicle controls the valve mechanism of a manifold vacuum operated motor operably connected to the clutch. In this type of mechanism the power element of the clutch motor is subjected to a varying differential pressure to regulate the disengagement and engagement of the clutch.

One of the well-known commercial types of clutch motors or clutch operators comprises a double-ended cylinder housing a reciprocable piston operably connected to the clutch pedal, wherein there is provided a three-way valve or so-called dump valve constituting part of the aforementioned control valve mechanism. The control valve is preferably operated by the accelerator in such manner as to alternately connect one end of the cylinder with the intake manifold of the engine and to the atmosphere to thereby initiate the clutch disengaging and engaging operations of the motor. Other valve means are provided for controlling the efflux of air from the other end of the cylinder to vary the loading of the clutch plates. One feature of the present invention is directed to the construction and mode of operation of the latter valve means.

To this end there is provided a pressure differential operated bleed valve incorporated in the vent from the last-mentioned end of the cylinder, the valve and the means for operating the same being so constructed and so interconnected with the engine of the vehicle as to operate in accordance with the degree of vacuum developed by a venturi mounted within the intake duct of a down-draft carburetor. This is an important feature, since heretofore the bleed valve has been operated by means, such for example as the manifold vacuum, which is subject to extraneous variables resulting in undesirable fluctuation of the valve. The prior art relating to controlling means for the bleed valve does not suggest such clutch operating mechanism including a valve structure such as disclosed by the instant invention, wherein the mechanism provides for a loading of the clutch plates to engage the clutch in such a manner that the loading is proportional to the engine torque.

Yet another object of the invention is to provide a pressure differential actuated clutch operator, wherein the throttle operating means of the vehicle serves as a common control means for the throttle and the control valve mechanism of the clutch operator. To this end there is provided a valve mechanism comprising a three-way or dump valve for initiating the clutch disengaging and engaging operations of the clutch operator, the said valve mechanism being controlled by the operation of the throttle. In the embodiment disclosed, there is also provided the bleed valve referred to above, the same comprising a power operated relay valve of the balanced type to provide a follow-up control of the clutch operator in effecting its clutch engaging operation.

Other objects of the invention and desirable details of construction and combinations of parts will become apparent from the following description of a preferred embodiment, which description is taken in conjunction with the accompanying drawings, in which.

Figure 1:
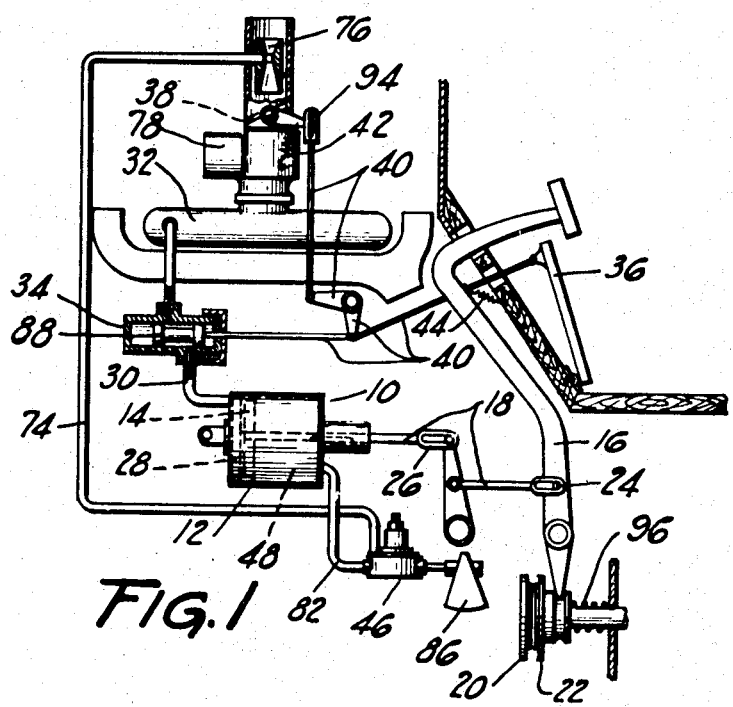
Figure 1 is a diagrammatic view of a preferred embodiment of the clutch control mechanism constituting the present invention.

Referring now to the preferred embodiment of the invention disclosed diagrammatically in Figure 1, there is provided a clutch motor 10 comprising a double-ended cylinder 12, preferably pivotally mounted to a fixed portion of the vehicle, said cylinder housing a reciprocable piston 14 constituting the power element of the motor and operably connected to a clutch pedal 16 by linkage 18. The clutch pedal serves to operate a conventional clutch comprising driving and driven plates 20 and 22 respectively. Pin and slot lost motion connections 24 and 26 provide a means, together with the power mechanism and clutch pedal 16, whereby the clutch may be operated either manually or by power, the connection 24 providing a means whereby the clutch pedal may be depressed without affecting the power means. A left compartment 28 of the cylinder 12 is alternately evacuated and vented to successively initiate a disengagement of the clutch and an engagement thereof by means of a conduit 30 connecting the clutch motor with the atmosphere and with an intake manifold 32 of an internal-combustion engine, not shown, a three-way valve 34 being incorporated in the conduit to effect the aforementioned control. The valve 34 is arranged to be operated by an accelerator 36, the latter also operating a throttle valve 38 of the engine, a linkage 40 interconnecting these parts. Springs 42 and 44 serve to return the throttle valve 38 and accelerator 36 to their respective "off" positions upon release of the accelerator. No claim is made to the aforementioned construction, for the same is disclosed and claimed in the patent to Ross I. Belcia, No. 1,470,272, dated October 9, 1923.

Figure 2:
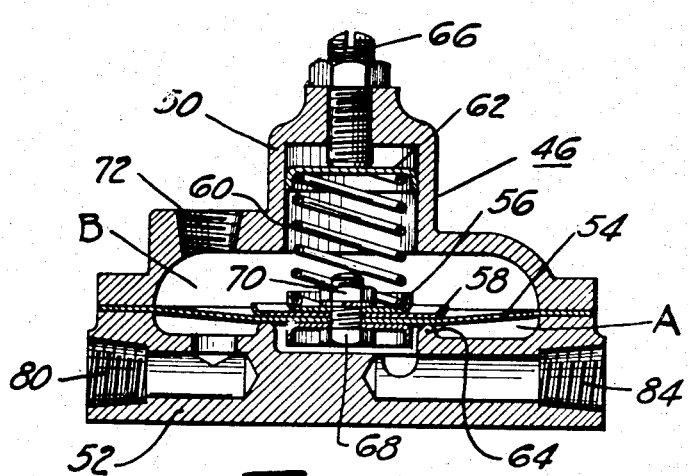
Figure 2 is a sectional view of the bleed valve mechanism of Figure 1.

The invention is, in part, directed to valve means 46 for regulating the efflux of air from a right compartment 48 of the cylinder 12 to thereby control the engagement of the clutch. The valve structure is disclosed in detail in Figure 2 and includes a casing comprising interconnected members 50 and 52, said members housing therebetween a diaphragm member 54 secured in position at its peripheral edge between the casing members. The valve provides chambers A and B to receive respectively the air from the compartment 48 and the air from a source to be described hereinafter. To the center of the diaphragm 54 are secured cup-shaped washers or retainers 56 and 58. A metal spring 60 is housed between a cup-shaped washer 62 and the washer 56, the spring serving to force the diaphragm 54 into engagement with a raised or land portion 64, constituting a part of the lower casing section 52. A stop member 66 is adjustably mounted in the casing member 50 and abuts the cup-shaped washer 62, providing a means to vary the compression of the spring 60. The diaphragm 54 and members 56 and 58 are clamped together by a bolt 68 and a nut 70. As indicated above, the diaphragm is normally seated, with the engine idling, upon the raised portion 64 integral with the casing member, that portion of the diaphragm contacting the raised portion 64 constituting, together with said latter portion, a bleed or blow-off valve, referred to in greater detail hereinafter. A port 72 in the casing member 50 is connected, by means of a conduit 74, with a Venturi structure 76 mounted at the air intake side of a down-draft type of carburetor 78. The chamber A of the bleed valve mechanism is connected, via a valve port 80, with the compartment 48 of the cylinder 12 by means of a conduit 82. To a port 84 in the casing member 52 is secured an inertia operated cut-off valve 86, said mechanism not being claimed herein, inasmuch as the same is disclosed and described in the application of Harold W. Price, Serial No. 622,513, filed July 14, 1932.

Figure 3:
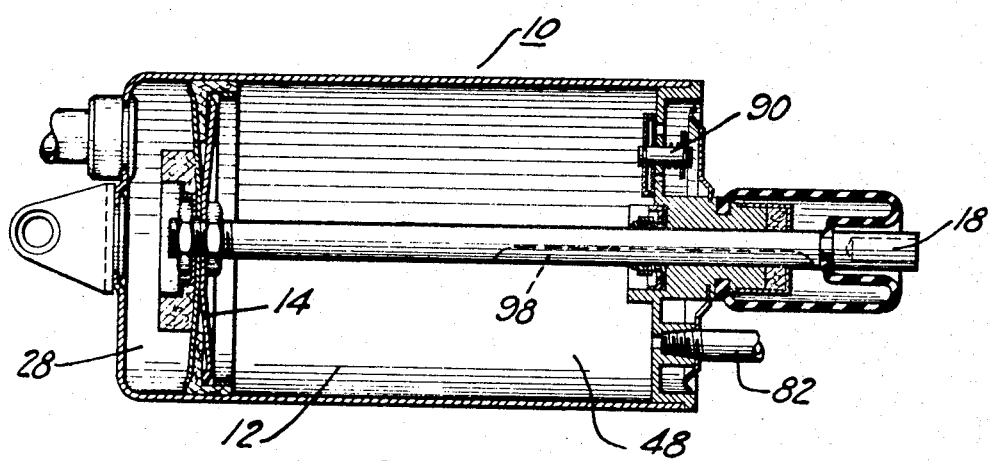
Figure 3 is a sectional view of the clutch operating pressure differential operated motor disclosed in Figure 1.
Figure 4:
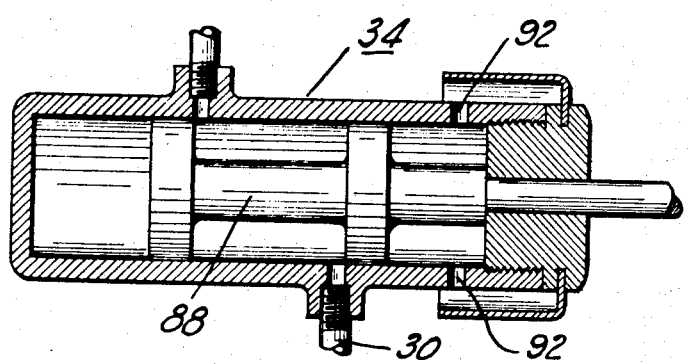
Figure 4 is a sectional view of the three-way valve mechanism of Figure 1.

Referring now to the operation of the above-described mechanism, with release of the accelerator the throttle is closed to idle the engine, thereby producing, by virtue of the pumping action of the engine pistons, a manifold vacuum of some twenty inches of mercury at sea level. The three-way valve 34 is, with the release of the accelerator, operated to intercommunicate the manifold with the left compartment 28 of the cylinder 12, a spool member 88 of the three-way valve being moved to the right, Figures 1 and 4, to effect this connection. The compartment 28 is accordingly partially evacuated, the atmosphere acting upon the right side of the piston 14, and entering the cylinder via an inwardly opening check valve 90, serving to move the piston to the left as disclosed in Figure 3 to disengage the clutch.

When it is desired to engage the clutch either to start the vehicle, or after a gear shifting operation, or possibly after a free-wheeling operation, the accelerator is depressed to move the valve member 88 to the left, closing off the connection with the manifold and venting the compartment 28 to the atmosphere via atmospheric ports 92 in the valve 34. The throttle is, of course, also open with the depression of the accelerator, however preferably after the valve member 88 has been moved to vent the cylinder, there being provided a lost motion connection 94 in the throttle linkage to accomplish this end.

With the venting of the compartment 28, the conventional clutch spring 96 immediately acts to engage the clutch, the mode of engagement being determined by the mode of efflux of air from the right compartment 48 of the cylinder 12. The air from the compartment passes rapidly from the cylinder via a slot 98 in the connecting rod 18, effecting a relatively rapid movement of the clutch pedal to take up the clearance between the clutch plates. When the piston 14 and connecting rod have moved to such a position that the slot 98 is either covered by the end wall of the cylinder or lies beyond said wall outside the cylinder, air may no longer pass from the cylinder via the slot: the air, however, continues to rapidly flow from the compartment 48, via the conduit 82, thence into the chamber A of the valve 46, through said valve, which is at this time slightly open owing to the superatmospheric pressure in the chamber, and out to the atmosphere via the inertia operated valve 86. The valve spring 60 is of such strength as to be compressed by the escaping air to open the bleed valve, said valve remaining open however only until the clutch plates have contacted with a predetermined relatively slight load. When this occurs the relatively high gaseous pressure within the compartment 48 of the cylinder automatically drops, to an amount however substantially above the pressure of the atmosphere, and the spring 60 automatically acts to seat the bleed valve, this operation being known in the art as a lapping of the valve. Thus, whenever the clutch is being engaged, the plates are always initially loaded to a predetermined amount, irrespective of the worn-in condition of the clutch facings, said loading depending upon the proportioning of the parts and the strength of the clutch spring and spring 60.

The above-described operation preferably takes place with an opening of the throttle just sufficiently to effect an operation of the three-way valve, the parts of the mechanism being adjusted to effect this result. With a continued depression of the accelerator the throttle is opened to speed up the engine, resulting in a decrease in pressure in the chamber B acting on the diaphragm 54. This pressure, together with the super-atmospheric pressure acting on the lower side of the diaphragm, acts to again crack the bleed valve, that is unseat the diaphragm, permitting a limited amount of air to escape from the compartment A. This may be described as a "blow-off" action of the valve, effecting a slight "blowing down" of the clutch motor. The diaphragm 54, however, once unseated acts almost immediately thereafter to seat again, the action being very fast, for the negative pressure developed by the venturi 76 in chamber B is insufficient of itself to overcome the spring 60 once the gaseous pressure of the air in chamber A is reduced by the above-described blow-off action of the bleed valve. With the escape of a limited quantity of air from the compartment 48 of the cylinder, the loading of the clutch plates is correspondingly increased by a predetermined amount in pounds.

Now, if the throttle is further operated, the above cycle of operations is repeated, the loading of the clutch plates being increased by the action of the clutch springs until the system is again in equilibrium, that is when the bleed valve is reseated. It will be noted that the sum of the forces acting to seat the diaphragm 54 and resulting from the additive effect of the pressure in the chamber B and the spring 60 is substantially equal to the force exerted by the pressure within the chamber A when the system is in equilibrium and the bleed valve is seated, and the pressure in chamber B decreases proportionately with the increase in pressure in chamber A. Furthermore, in order to unseat the bleed valve the pressure in chamber A must be increased, so that the force resulting from the sum of the loading of the spring 60 and the pressure in chamber B is less than the force exerted by the gas within the chamber A. It therefore follows that the force exerted by the clutch springs at any given instant after the clutch plates have contacted is directly proportional to the pressure in the chamber B, and therefore directly proportional to the degree of opening of the throttle.

The bleed or blow-off valve is rendered operable by virtue of the evacuation of the chamber B within the valve mechanism. The velocity of air passing through the venturi 76 is effective to draw the air from said chamber through the conduit 74 in accordance with the degree of throttle opening, the latter progressively increasing the air intake via the venturi. Thus the degree of vacuum within the chamber B is increased in direct proportion to the degree of throttle opening.

This, however, is exactly the end desired, for the loading of the clutch should be regulated in accordance with the speed of the engine, and the resultant torque of the engine driven clutch plate or flywheel to effect the desired smooth engagement of the clutch and also obviate any possible stalling of the engine.

With the above-described mechanism there is provided in a relatively simple fluid operated clutch operator or so-called automatic clutch the principal advantages of the more complicated centrifugal clutch of the day. Furthermore, it should be noted that the balanced valve mechanism suggested provides the much desired follow-up to-lap type of control of the clutch motor.

The invention heretofore described is disclosed in my copending application No. 694,437, filed October 20, 1933, this application constituting a division thereof.

While one illustrative embodiment has been described, it is not my intention to limit the scope of the invention to that particular embodiment, or otherwise than by the terms of the appended claims.

I claim:

1. In a clutch control mechanism for an automotive vehicle provided with a clutch, a downdraft carburetor having mounted within the intake duct thereof a venturi, a pressure differential operated motor operably connected with the clutch, and control valve mechanism for said motor comprising valve means for controlling the clutch engaging operation of said motor, said valve means being operative in accordance with the gaseous pressure developed within the aforementioned venturi.

2. In a clutch control mechanism for an automotive vehicle provided with a clutch, a downdraft carburetor having mounted within the intake duct thereof a venturi, a pressure differential operated motor operably connected with the clutch, and control valve mechanism for said motor comprising a pressure sensitive valve, fluid transmitting means interconnecting said valve and venturi, and other fluid transmitting means interconnecting said valve and motor.

3. In a clutch control mechanism for an automotive vehicle provided with a clutch and further provided with a venturi mounted within the intake duct of a carburetor, a pressure differential operated motor operably connected with the clutch, and control valve mechanism for said motor comprising a pressure balanced valve, fluid transmitting means interconnecting said valve and venturi, and other fluid transmitting means interconnecting said valve and motor, said control valve mechanism further comprising a valve operative to initiate the clutch disengaging and engaging operations of said motor.

4. In a clutch control mechanism for an automotive vehicle provided with an intake manifold, a throttle valve, and a clutch, a carburetor mechanism having mounted within the intake duct thereof a venturi, and an accelerator, a double-ended pressure differential operated motor operably connected with the clutch, and control valve mechanism for said motor comprising a pressure sensitive valve, fluid transmitting means interconnecting said valve and venturi, and other fluid transmitting means interconnecting said valve and one of the compartments of said double-ended motor, said control valve mechanism further comprising a valve operative to initiate the clutch disengaging and engaging operations of said motor.

WILLIAM S. WATTS.